TRIGONOMETRIC CONVERTER

Filed Jan. 11, 1956

INVENTOR.
GARETH M. DAVIDSON
BY Raymond A. Paquin
ATTORNEY.

2,922,578

TRIGONOMETRIC CONVERTER

Gareth M. Davidson, Bronx, N.Y., assignor to American Bosch Arma Corporation, a corporation of New York Application January 11, 1956, Serial No. 558,546

3 Claims. (Cl. 235—189)

The present invention relates to trigonometric conversion devices and has particular reference to electrical circuits for converting the polar coordinates of a quantity into its rectangular coordinates.

When the polar coordinates of a vector quantity are represented by a variable time phase signal it is sometimes desirable to convert this signal into two in-phase signals proportional to the rectangular components of the vector quantity. In accordance with this invention the variable time phase signal unbalances the heating of a pair of thermal units, in conjunction with a feedback signal from each of the thermal units. The heater of one unit is energized by an in-phase reference signal and the heater of the other unit is energized by a quadrature reference signal thereby limiting the thermal unbalance of each unit to that represented by the magnitudes of the in-phase and quadrature components respectively. The resulting thermal unbalances influence the temperature sensitive resistor of the thermal units which are both energized by a reference voltage of the same phase thereby producing two in-phase voltages proportional respectively to the rectangular coordinates of the vector quantity whose polar coordinates are known.

For a more complete understanding of this invention, reference may be had to the accompanying diagrams in which.

The application of thermal elements comprising heating and heated resistors in computing devices are becoming more and more numerous. For simplicity in making schematic wiring diagrams the symbolic representation of Figure 2 has been adopted and has been described in several articles appearing in technical periodicals.

Figure 1:
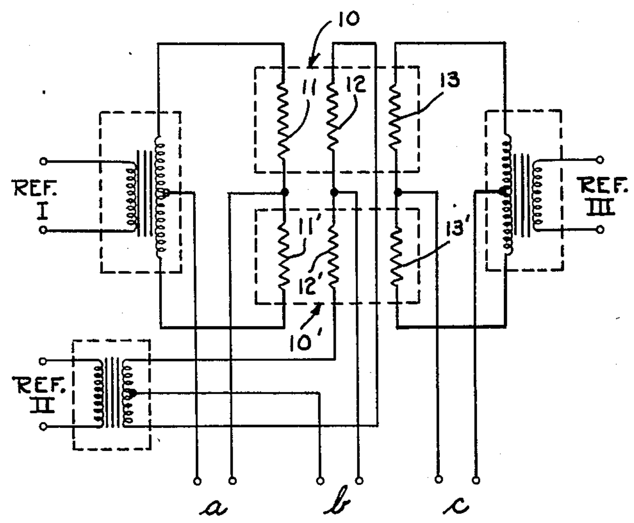
Figure 1 is a schematic wiring diagram of a thermal unit.

Figure 1 shows the actual electrical connections to a pair of similar thermal elements 10 and 10' each containing one heating resistor 11 and 11' respectively, having a low co-efficiency of temperature and a pair of heated resistors 12, 13 and 12', 13' respectively, made of a high temperature co-efficient material. A reference voltage I is applied across the series connected heating resistor 11, 11' and a signal voltage "*a*" is applied between the center tap of the reference voltage I and the junction of resistors 11, 11' to unbalance the temperature of the resistors 11, 11' accordingly. A second reference voltage II is applied across the series connected temperature sensitive resistor 12, 12' and a signal voltage "*b*" appears between the center tap of reference voltage II and the junction of the resistors 12, 12' as a result of the unbalance in resistance caused by the temperature unbalance. Similarly, a third reference voltage III is applied across the temperature sensitive resistors 13, 13' and a signal voltage "*c*" appears between the center tap of reference voltage III and the junction of resistors 13, 13'. The positions of any reference voltage and the corresponding signal voltage may be reversed if desired, without changing the operation of the circuit. Also, the reference voltages may in practice be additional signal voltages in some applications.

For a more complete description of the thermal elements in voltage multiplying arrangement reference may be had to the copending application Serial Number 261,255 filed December 12, 1951, now Patent No. 2,841,329.

Figure 2:
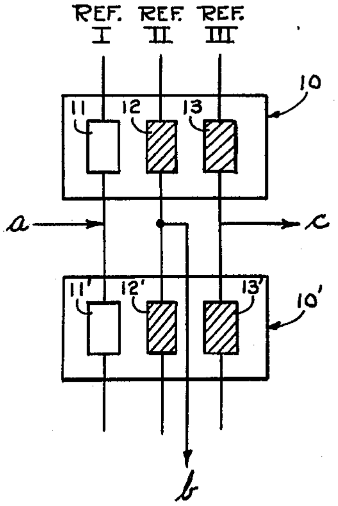
Figure 2 is the symbolic representation of Figure 1 which is used for simplicity.

Figure 2 is the symbolic representation of Figure 1 where the blank rectangles 11, 11' represent heating resistors and the shaded rectangles 12, 12', 13 and 13' represent the temperature sensitive resistors. Reference voltages I, II and III are shown as being applied to the appropriate series connected resistors while the signal voltage "*a*" is shown as being applied to the heaters 11, 11' and the signal voltages "*b*" and "*c*" are taken from the heated resistors 12, 12' and 13, 13' respectively.

Figure 3:
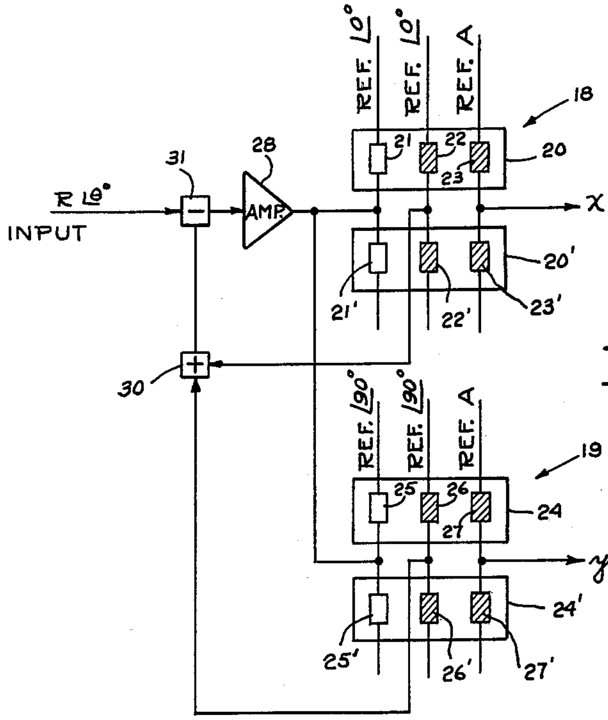
Figure 3 is a symbolic diagram of the trigonometric solution circuit.

Referring now to Figure 3 where the symbolic representation for thermal elements is used, a circuit for conversion of polar to rectangular components is shown.

The polar coordinates of any vector may be represented by a variable time phase electrical signal in which the magnitude of the signal is proportional to the magnitude R of the vector while the phase angle of the signal, when compared to a fixed reference voltage, indicates the direction angle of the vector. Since the present invention can use only time phase signals and the angle may sometimes be available in the form of space-phase rather than a time-phase, a well known network using rotating components such as electro-mechanical resolves for example, can be used to perform the conversion to a time phase signal.

In Figure 3 on thermal unit 18 comprising a pair of thermal elements 20, 20' has its heater resistors 21, 21' and the temperature sensitive resistors 22, 22' all energized by a constant magnitude reference voltage of zero time phase and of the same frequency as the $R\angle\theta$ signal. The other thermal unit 19 comprises a pair of thermal units 24, 24' in which the heater resistors 25, 25' and one heated resistor 26, 26' are energized by a constant magnitude reference voltage having a phase angle of 90° (in quadrature with the zero phase reference voltage but of the same frequency as the $R\angle\theta$ input signal. The other heated resistors 27, 27' of thermal elements 24, 24' are energized by the constant reference voltage of zero phase angle.

The output of amplifier 28 is applied to the heater resistors 21, 21' and 25, 25' of the thermal units 18 and 19 respectively to produce an unbalance of thermal elements 20, 20' according to the zero phase component of the amplifier output, and to produce an unbalance of thermal elements 24, 24' according to the quadrature phase component of the amplifier output since the thermal units are unbalanced by signals of the same phase as the reference voltage to their heater resistors.

Although the same signal feeds both sets of thermal elements, the reference voltages to these elements are not the same. (Reference voltage to 20, 20' is of zero phase and reference voltage to 24, 24' has a phase angle of 90°). If there is a carrier phase difference $\phi$ between signal voltage $a$ and reference voltage $b$ the heat differential would be $4\ ab \cos \phi$; in particular it would be reduced to zero if $\phi$ were equal to 90°. Thus, only those components of the amplifier output which are in phase with the reference voltage to the thermal heater elements will create a heat unbalance. Accordingly only the zero phase component will produce a heat unbalance in thermal unit 18 while only the quadrature phase component will produce a heat unbalance in the thermal unit 19.

The outputs of each of the thermal units 18 and 19 are connected in series at 30 and the total voltage is compared with the $R\angle\theta$ input signal at 31. The error or difference signal is applied to the high-gain amplifier 28 whose output is connected as described.

Thus, it will be seen that the thermal unit 18 is driven by amplifier 28, so that its output matches the in-phase, or "X", component of the $R\angle\theta$ input signal while the thermal unit 19 is driven by amplifier 28 so that its output matches the quadrature phase, or "Y" component of the $R\angle\theta$ input signal.

The other temperature sensitive resistors 23, 23' of thermal unit 18 energized by a reference volage A, are also unbalanced according to the $x$ component of $R\angle\theta$ and the remaining temperature sensitive resistors 27, 27' of thermal unit 19, also energized by the reference voltage A, are unbalanced according to the $y$ component of $R\angle\theta$. The reference voltage A may be of a frequency different from that of the input signal. For example, the input signal may be a 60 cycle signal, while the reference voltage A can be a 400 cycle voltage. The "X" and "Y" signals will be in-phase since the output circuits of both thermal units 18 and 19 are energized by the same voltage, reference A.

I claim:

1. In a device of the character described, an input signal having an amplitude proportional to the magnitude of a vector quantity and a phase angle with respect to a reference phase equal to the angle of said vector quantity, a first constant voltage power supply of reference phase, a second constant voltage power supply in quadrature with said reference phase, and a third constant voltage power supply of selected phase and frequency, a first thermal transducer having a pair of heater members and two pairs of sensor members in close thermal contact, said heater members being equally energized by said first constant voltage of reference phase, a first pair of said sensor members being energized by said first constant voltage of reference phase and the second pair of said sensor members being energized by said third constant voltage power supply, a second thermal transducer having a second pair of heater members and third and fourth pairs of sensor members in close thermal contact, said second pair of heater members being energized by said second constant voltage in quadrature with said reference phase, said third pair of sensor members being energized by said second constant voltage in quadrature with said reference phase, said fourth pair of sensor members being energized by said third constant voltage power supply, an amplifier having an input and an output, electrical connections between the output of said amplifier and said heater member pairs to unbalance the energization thereof series electrical connections between said first and third sensor member pairs, said input signal and the amplifier input and output connections from said second and fourth sensor member pairs.

2. In a device of the character described, an input signal having an amplitude proportional to the magnitude of a vector quantity and a phase angle with respect to a reference voltage equal to the angle of said vector quantity, means for deriving from said input signal two quantities representing components of said input signal which are in-phase and in quadrature with said reference voltage and means for producing a pair of output signals severally proportional to the magnitude of each of said two quantities and which are in-phase with each other.

3. In a device of the character described, an input signal having an amplitude proportional to the magnitude of a vector quantity and a phase angle with respect to a reference voltage equal to the angle of said vector quantity, thermal means for deriving from said input signal two quantities representing components of said input signal which are in-phase and in quadrature with said reference voltage and thermal means for producing a pair of output signals severally proportional to the magnitude of each of said two quantities and which are in-phase with each other.

References Cited in the file of this patent

UNITED STATES PATENTS

| | | |
|---|---|---|
| 1,869,128 | Bedford | July 26, 1932 |
| 2,535,666 | Broding | Dec. 26, 1950 |
| 2,695,967 | Schwartz | Nov. 30, 1954 |

OTHER REFERENCES

Tele-Tech & Electronic Industries (Savet), February 1954, pages 101 and 122.